(12) United States Patent
Telefus

(10) Patent No.: US 6,370,039 B1
(45) Date of Patent: Apr. 9, 2002

(54) ISOLATED POWER CONVERTER HAVING PRIMARY FEEDBACK CONTROL

(75) Inventor: Mark D. Telefus, Orinda, CA (US)

(73) Assignee: IWatt, Los Gatos, CA (US)

( * ) Notice: Subject to any disclaimer, the term of this patent is extended or adjusted under 35 U.S.C. 154(b) by 0 days.

(21) Appl. No.: 09/540,058

(22) Filed: Mar. 31, 2000

Related U.S. Application Data

(63) Continuation-in-part of application No. 09/444,032, filed on Nov. 19, 1999.

(51) Int. Cl.[7] .......................... H02M 3/00; H02M 3/22; H02M 3/335
(52) U.S. Cl. ............................. 363/15; 363/26; 363/41; 363/131
(58) Field of Search .............................. 363/15, 16, 24, 363/25, 26, 40, 41, 131

(56) References Cited

U.S. PATENT DOCUMENTS

| | | | |
|---|---|---|---|
| 3,781,505 A | * 12/1973 | Steigerwald | 219/626 |
| 4,251,857 A | 2/1981 | Shelly | 363/124 |
| 4,533,986 A | 8/1985 | Jones | 363/17 |
| 4,796,173 A | 1/1989 | Steigerwald | 363/25 |
| 5,038,264 A | 8/1991 | Steigerwald | 363/21 |
| 5,317,496 A | 5/1994 | Seiersen | 363/24 |
| 5,402,329 A | 3/1995 | Wittenbreder, Jr. | 363/16 |
| 5,424,933 A | * 6/1995 | Illingworth | 363/21 |
| 5,434,767 A | 7/1995 | Batarseh et al. | 363/16 |
| 5,448,466 A | * 9/1995 | Erckert | 363/16 |
| 5,621,627 A | 4/1997 | Krawchuk et al. | 363/37 |
| 5,642,273 A | 6/1997 | Lai et al. | 363/56 |
| 5,694,007 A | * 12/1997 | Chen | 315/247 |
| 5,694,304 A | 12/1997 | Telefus et al. | 363/21 |
| 5,712,771 A | 1/1998 | Fitter et al. | 363/17 |
| 5,712,772 A | 1/1998 | Telefus et al. | 363/21 |
| 5,856,919 A | 1/1999 | Moriarty, Jr. | 363/101 |
| 5,946,203 A | 8/1999 | Jiang et al. | 363/46 |
| 5,982,644 A | 11/1999 | Hulsey et al. | 363/26 |
| 5,991,172 A | * 11/1999 | Jovanovic et al. | 363/21 |
| 5,999,417 A | 12/1999 | Schlecht | 363/16 |
| 6,008,589 A | 12/1999 | Deng et al. | 315/209 R |

FOREIGN PATENT DOCUMENTS

| | | | | |
|---|---|---|---|---|
| EP | 0 944 162 A1 | 3/1998 | | H02M/3/337 |
| WO | WO 88/09084 | 11/1988 | | H02M/3/337 |

OTHER PUBLICATIONS

Jordan, M., O'Connor, John A., "Resonant Fluorescent Lamp Converter Provides Efficient and Compact Solution," Unitrode Integrated Circuits, Merrimack, NH 03054, IEEE, 1993, No. 0–7803–098200/93, Pub. Jul. 3, 1993.

* cited by examiner

*Primary Examiner*—Bao Q. Vu
(74) *Attorney, Agent, or Firm*—Lyon & Lyon LLP

(57) ABSTRACT

The present invention comprises an isolated dual power supply having an internal feedback loop. The dual power supply comprises power converter responsive to an error signal for generating a DC internal regulated output voltage coupled to a DC/AC switching power converter having a transformer. The primary winding of the transformer is coupled to the DC internal output voltage and to one or more power switches. A control circuit drives the one or more power switches such that an alternating current having substantially a constant duty cycle flows through the primary winding. An error amplifier produces a control signal proportional to the difference of an output voltage at a load coupled to the secondary winding and a reference voltage equal to the maximum expected voltage losses at the load. The error signal is formed from a combination of the control signal and a signal proportional to the internal voltage output.

17 Claims, 13 Drawing Sheets

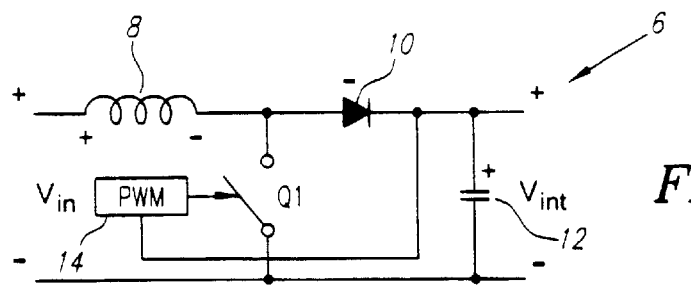
FIG. 2A
(PRIOR ART)
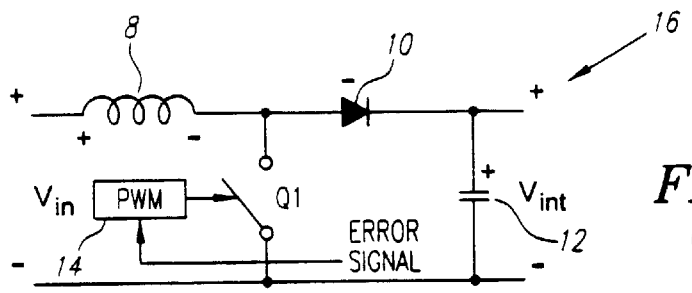
FIG. 2B
(PRIOR ART)
FIG. 3A
(PRIOR ART)
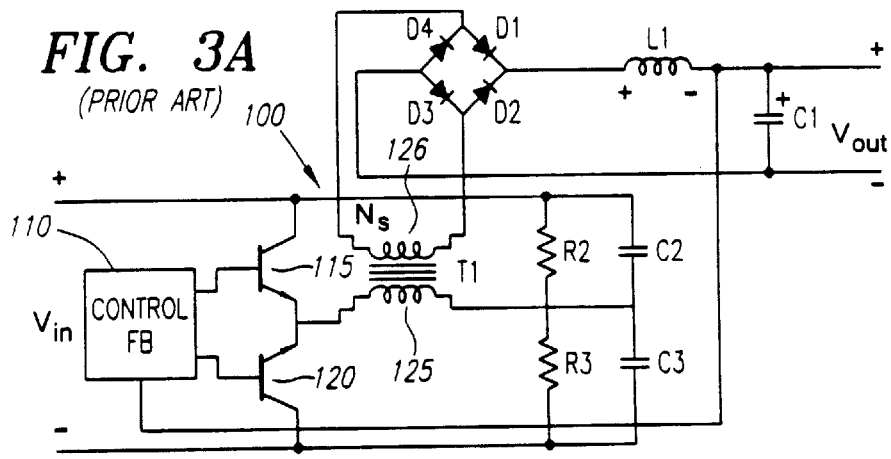
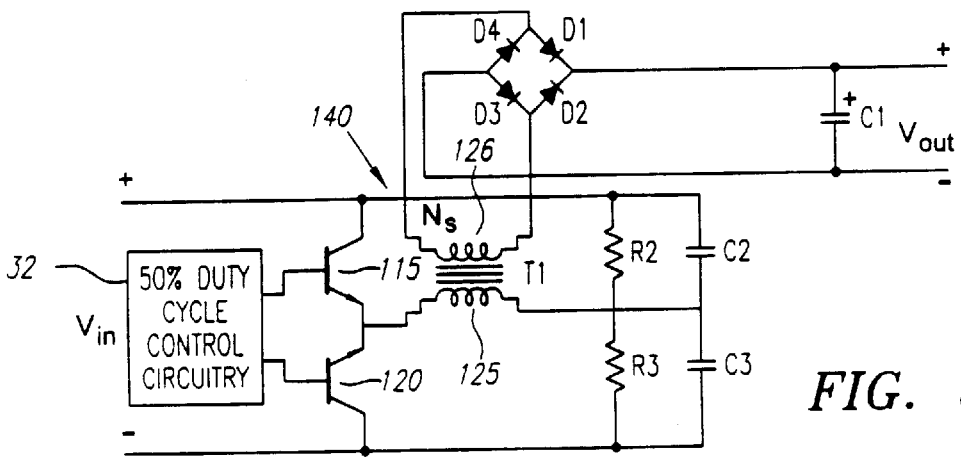
FIG. 3B

ISOLATED POWER CONVERTER HAVING PRIMARY FEEDBACK CONTROL

RELATED APPLICATION DATA

This application is a continuation-in-part of U.S. Ser. No. 09/444,032, filed Nov. 19, 1999 is pending.

FIELD OF THE INVENTION

This invention pertains generally to the field of power conversion and more particularly to a pulse width modulated switching power supply with feedback control.

BACKGROUND

Compact and efficient power supplies are an increasing concern to users and manufacturers of electronics. Pulse width modulated (PWM) switching power supplies offer both compactness and efficiency in a number of different topologies. Boost and buck PWM switching power supply topologies are efficient, but do not isolate the power input from the power output. Other topologies, such as the flyback, do isolate the power input from the power output by using a transformer. In such topologies, however, feedback from the secondary (power output) side of the transformer is required to adjust the pulse width modulation of the power switch. To properly compensate the feedback from the secondary requires extra components and often involves expensive re-design, depending upon the particular application.

Prior art isolated power supplies that used feedback only from the primary side of the transformer did not account for current losses encountered in the load. See, e.g., U.S. Pat. No. 5,982,644, (the '644 patent), which discloses a pulse-width-modulated boost converter coupled to a high voltage converter, which in turn is coupled to the primary side of a transformer. The modulation of the boost converter is adjusted according to an amplified error signal representing the difference between the boost converter's output voltage and the voltage from a current sensing circuit sensing the current through the primary winding. This error signal has no way of sensing and accounting for the current losses in the load. Thus, the power supply disclosed in the '644 patent employs a linear regulator on the secondary side of the transformer to maintain a constant voltage over the load. Although this power supply avoids the use of feedback from the secondary side of the transformer, it introduces the expense and loss associated with installing an additional regulator at the load.

There is a need in the art for an improved power supply that that isolates the input and outputs through a transformer without requiring feedback from the secondary side of the transformer, thereby easing design and reducing the component count.

SUMMARY OF THE INVENTION

In accordance with one aspect of the present invention, a power supply comprising a voltage regulator coupled to a DC-to-AC switching power converter is provided. The voltage regulator regulates a DC internal voltage output responsive to an error signal. The DC-to-AC switching power converter (DC/AC converter) includes a transformer having a primary winding coupled to one or more power switches and to the DC internal voltage output. A constant duty cycle control circuit switches the one or more power switches at a fixed rate such that an alternating current flows through the primary winding. Because the alternating current through the primary winding has a constant duty cycle, an output voltage across a load coupled to a secondary winding of the transformer is linearly related to the internal voltage output. An error amplifier outputs a control signal, wherein the control signal is proportional to the difference between a voltage proportional to the current through the secondary winding of the transformer and a reference signal proportional to the maximum voltage losses expected at the secondary winding. A signal proportional to the internal voltage output is combined with the control signal to form the error signal.

In accordance with another aspect of the invention, the voltage regulator may be a boost converter, a buck converter, a buck/boost converter or a linear regulator. Suitable DC/AC converters include a half-bridge, full-bridge, flyback, push-pull, or a full-wave resonant transition converter. In a preferred embodiment, the one or more power switches of the DC/AC converter may comprise a first and a second resonant switch wherein the constant duty cycle control circuit alternatively switches the first resonant switch ON when the second resonant switch is OFF and switches the second resonant switch ON when the first resonant switch is OFF such that the ON and OFF times of each switch are substantially equal, whereby the alternating current flowing through the secondary winding has substantially a 50% duty cycle. When the first resonant switch is ON, a resonant capacitor is coupled to the internal voltage output such that a first half cycle of the alternating current flows through the primary winding in a first direction. Alternatively, when the second resonant switch is ON, the resonant capacitor discharges such that a second half cycle of the alternating current flows in a second direction, opposite to the first direction, through the primary winding. The resonant capacitor may be either in series or in parallel with a leakage inductance of the primary winding, forming a series resonant tank or a parallel resonant tank, respectively.

In accordance with a still further aspect of the invention, a power supply comprising a voltage regulator for regulating an internal voltage output responsive to an error signal coupled to a plurality of DC/AC converters is provided. Each DC/AC converter in the plurality of DC/AC converters includes a transformer having a primary winding coupled to one or more power switches and to the internal output voltage. A control circuit controls the one or more power switches such that an alternating current having a constant duty cycle flows through the primary winding. Because the alternating current through the primary winding has a constant duty cycle, the transformer becomes a linear element. An error amplifier within each DC/AC converter outputs a control signal proportional to the difference between a voltage proportional to the current through a secondary winding of the transformer and a reference voltage proportional to the maximum voltage losses at the load. Each control signal is combined together along with a signal proportional to the internal voltage output to form the error signal. A clock coupled to the plurality of DC/AC converters permits the one or more switches within each of the DC/AC converters to be switched synchronously with each other. An intelligent switch may be coupled between the voltage regulator and the plurality of DC/AC converters wherein a given DC/AC converter is coupled to the internal voltage output through the intelligent switch only when required to support a required voltage across the load.

In accordance with a still further aspect of the present invention, methods of generating DC or AC power are provided. In one embodiment, the method comprises generating an internal voltage output using a voltage regulator wherein the regulation is responsive to an error signal. The internal voltage output is coupled to a primary winding of a transformer such that a first current flows in a first direction through the primary winding during a first period. The internal regulated voltage output is then decoupled from the primary winding such that a second current flows in a second direction opposite the first direction through the primary winding during a second period, a duty cycle thereby formed by the first and second period being maintained the same, period-to-period. The difference between a voltage proportional to the current through the secondary winding and a reference voltage proportional to the maximum expected voltage losses at the load forms a control signal. The control signal and a signal proportional to the internal voltage output are combined to create the error signal.

Other aspects and advantages of the present invention are disclosed by the following description and figures.

DESCRIPTION OF FIGURES

The various aspects and features of the present invention may be better understood by examining the following figures:

FIG. 1b illustrates the feedback paths in the power supply of FIG. 1a.

FIG. 2a illustrates a prior art PWM boost power converter.

FIG. 2b illustrates a PWM boost power converter according to one embodiment of the present invention.

FIG. 3a illustrates a prior art half-bridge switching power converter.

FIG. 3b illustrates a half-bridge switching power converter according to one embodiment of the present invention.

FIG. 6b illustrates further details of the load compensation feedback path in FIG. 6a.

DETAILED DESCRIPTION

Figure 1A:
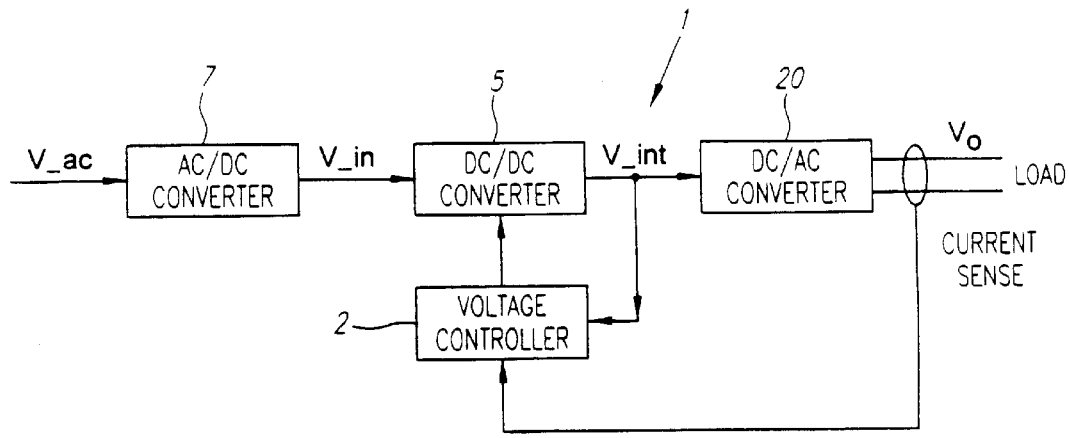
FIG. 1a illustrates a power supply comprising a DC/DC power converter coupled to a DC/AC converter according to one embodiment of the invention.

Turning now to FIG. 1a, one embodiment of the power supply 1 of the present invention is illustrated. In this embodiment, a voltage regulator or DC/DC converter 5 couples to a DC/AC converter 20. Because of these two stages, the resulting power supply 1 has a "dual converter" topology. The power supply 1 receives an unregulated DC voltage input, $V_{in}$, which may be generated by a rectifier or AC/DC converter 7 operating on an unregulated AC input, $V_{ac}$, to generate a regulated AC or DC output voltage, $V_o$. A transformer 24 (illustrated in FIG. 1b) within the DC/AC switching power converter 20 isolates the regulated AC or DC output voltage, $V_o$, from the unregulated DC voltage input, $V_{in}$.

Within the power supply 1, the DC/DC converter 5 receives the unregulated DC input voltage, $V_{in}$, and produces an internal regulated voltage output, $V_{int}$, that is regulated by a voltage controller 2 according to an error signal uniquely generated by the present invention. Because the voltage output, $V_{int}$, is internal to the power supply 1, it may be considered "preregulated" as compared to the regulated output voltage, $V_o$. As will be further described herein, should the DC/DC converter be a switching power converter, the voltage controller 2 may be a pulse-width modulator (PWM). Thus, the voltage controller 2 is illustrated separately from the voltage regulator or DC/DC converter 5 for discussion purposes only; those of ordinary skill in the art will appreciate that a voltage regulator must contain a voltage controller 2 to regulate the internal voltage output, $V_{int}$.

The error signal of the present invention is derived from both the internal regulated voltage output, $V_{int}$, and a signal proportional to the voltage losses at the load. As used herein, "voltage losses at the load" refers to the losses incurred between the primary winding of the transformer 24 and the load. This includes losses in the transformer 24, losses in a rectifier or AC/DC converter (illustrated in FIG. 1c) imposed between the load and the transformer, and conduction losses. For example, suppose a power supply is specified to produce 5 volts at the load. If the load is not drawing any current, these losses will be minimal, allowing the power supply to produce 5 volts at the load. However, during a period of heavy demand in which the load is drawing a relatively large current, these conduction losses will be appreciable, resulting in a voltage drop below 5 volts at the load. Prior art power supplies typically accounted for these conduction losses by directly sensing the voltage at the load and feeding this sensed voltage back into the power supply. Because the load is isolated through the transformer 24, such direct sensing of the losses required the use of optoisolators or other isolating means, complicating the design of such power supplies. In contrast, the present invention permits the voltage losses at the load to be indirectly sensed by sensing the current through the primary winding of the transformer 24.

Figure 1B:
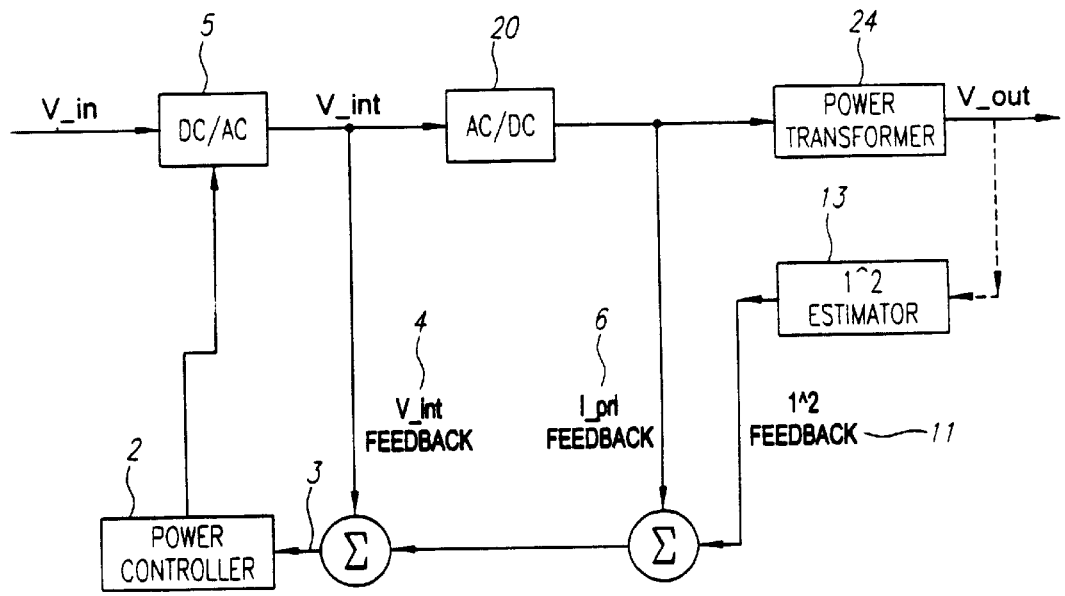

Turning now to FIG. 1b, the unique feedback path of the present invention is further illustrated. The internal voltage output, $V_{int}$, is regulated by the DC/DC converter 5 under the control of the voltage controller 2. In turn, the voltage controller 2 is responsive to an error signal 3 representing feedback from three separate signals: feedback from the internal voltage output, denoted as $V_{int}$ feedback 4; feedback from the current through the primary winding, denoted as $I_{PR}$ feedback 6; and feedback from a voltage proportional to the voltage losses at the load, denoted as I^2 feedback 11. Note that no direct feedback is necessary from the secondary (load) side of the transformer 24. Instead, the present invention senses the current through the primary winding of the transformer 24. As will be further described herein, because the DC/AC converter 20 is controlled to produce an alternating current through the primary winding of the transformer 24 having a constant duty cycle, the currents through the primary winding and the secondary winding are linearly related. In turn, this indicates that by sensing the primary current, $I_{PR}$, the present invention may indirectly sense the current through the secondary winding. An estimator 13, described further herein, processes this indirectly sensed current to estimate the voltage losses at the load. Note that the various feedback signals are illustrated in FIG. 1b as being summed to form the error signal 3. Those of ordinary skill will appreciate that this may represent a theoretical combination as compared to an actual linear addition of the feedback signals—what is important is that the voltage controller 2 be responsive to all the feedback signals. Thus, as used herein, any summation illustrated in the feedback paths of the present invention may illustrate an actual summation or merely a theoretical summation.

Figure 1C:
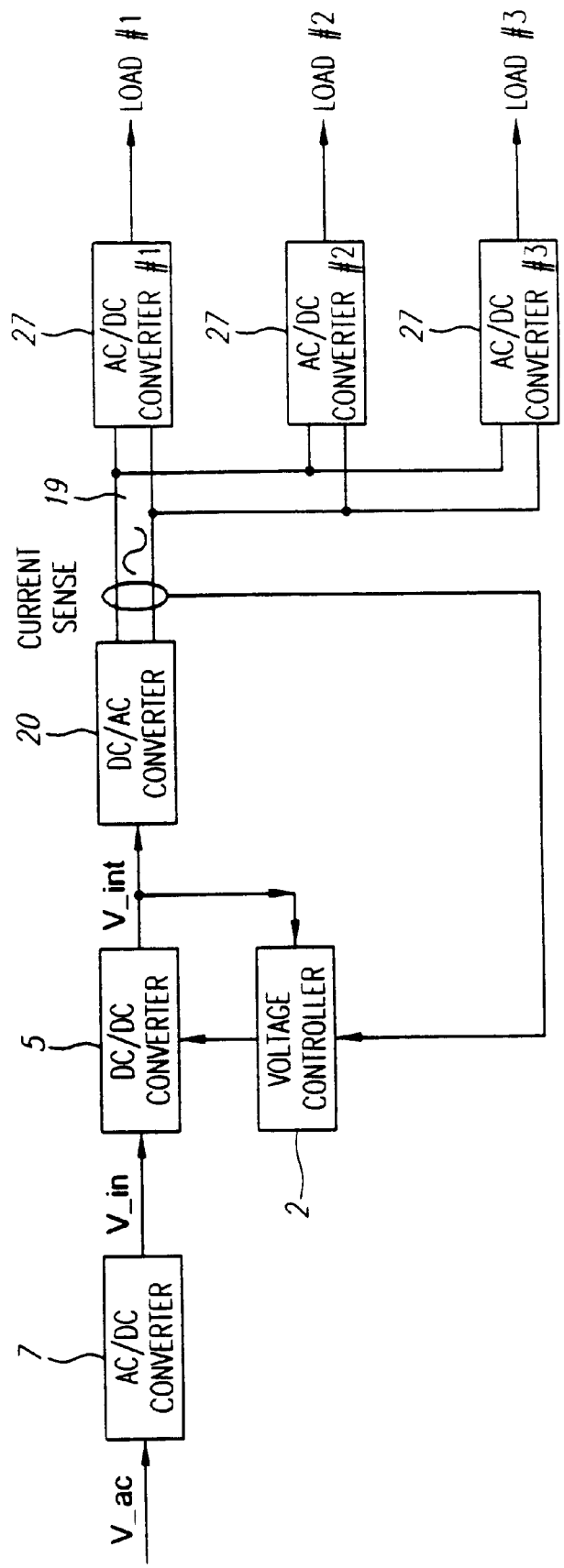
FIG. 1c illustrates the power supply of FIG. 1 coupled to an AC rail.

Referring now to FIG. 1c, a particular application of the power supply 1 is illustrated. This embodiment includes the AC/DC converter 7, the DC/DC converter 5, the voltage controller 2, and the DC/AC converter 20 discussed with respect to FIGS. 1a and 1b. The AC voltage output produced by the DC/AC converter 20 is coupled to an AC rail 19 for distribution. For example, the AC rail could be a coaxial cable, stripline, or other suitable form of transmission line. The AC rail 19 may then distribute power to a plurality of loads. Should DC power be desired, rectifiers or AC/DC converters 27 are coupled between the loads and the AC rail 19.

As used herein, the DC/DC converter 5 may include any suitable form known in the art, for example, a pulse-width-modulated (PWM) switching power converter or a linear voltage regulator. Because PWM switching power converters are generally more efficient, they will be illustrated in the following embodiments of the invention. That is not to imply, however, that other types of modulated switching power converters such as frequency modulated switching power converters or a linear power regulator could not be used to generate the internal regulated voltage output. For example, a linear power regulator, although it is lossy as compared to a switching power converter, may be desired for certain low-noise applications.

Among PWM switching power converters, the DC/DC converter 5 may be of any type known in the art such as a boost, buck, buck/boost, flyback, half-bridge, forward, push-pull, or fall-bridge switching power converter. Each of these known power converters must be slightly altered to respond to the uniquely derived error signal of the present invention. This modification is illustrated in FIGS. 2a and 2b. Referring now to FIG. 2a, a prior art boost converter 6 is illustrated. The boost converter 6 comprises a power switch Q1 (typically a field effect transistor (FET)) coupled to a boost inductor 8, a steering diode 10, and a storage capacitor 12. A pulse-width modulator 14 adjusts a duty cycle of the power switch Q1 in response to sensing an output voltage, $V_{out}$. The relationship between the input voltage, $V_{in}$, and $V_{out}$ may be approximated as $$V_{out}=V_{in}*(T/t_{off})$$

where T is the switching period and $t_{off}$ is the off time of the power switch Q1.

Note that should the boost converter 6 of FIG. 2a be used as the power converter 1, it must be responsive to the error signal derived according to the present invention. Thus, the boost converter 6 of FIG. 2a must be modified so that its pulse-width modulator 14 adjusts the duty cycle of the power switch Q1 as a function of this error signal. FIG. 2b illustrates this modification wherein the pulse-width modulator 14 of the modified boost converter 16 is no longer simply responsive to the output voltage, $V_{out}$, but instead is responsive to the error signal generated by the present invention. Because the output voltage will be coupled to a DC/AC converter, it is now denoted as an internal voltage output, $V_{int}$. Those of ordinary skill in the art will appreciate that the same modification would readily be applied to other prior art power converters such as a buck power converter.

Referring back to FIG. 1a, a DC/AC switching power converter 20 couples to $V_{int}$ to generate an isolated voltage output, $V_o$, through a transformer 24 (illustrated in FIG. 3). Just as the DC/DC converter 5 may comprise many forms known in the art, the DC/AC switching converter 20 also may assume many forms known in the art so long as it is capable of producing an alternating current having a constant duty cycle through the primary winding of the transformer 24 (illustrated in FIG. 4). These switching power converter forms include a half-bridge, full-bridge, flyback, push-pull, or a full-wave resonant transition converter.

Although the DC/AC switching power converter 20 may take many forms known in the art, each must be slightly altered to conform to the present invention. For example, the power switch(es) within prior art half-bridge, full-bridge, flyback or push-pull switching power converter are typically pulse-width modulated according to feedback derived from an output voltage. In the present invention, these switch(es), rather than being subject to PWM control, are switched at a fixed rate to generate an alternating current having a constant duty cycle in the primary winding of the transformer. In addition, certain storage elements may not be needed. As an example of prior art switching power converters, consider FIG. 3a, which illustrates a half-bridge switching power supply 100. In this power supply 100, a pulse-width modulator 110 controls the switching of transistors 115 and 120 coupled to the primary winding 125 of transformer T1. The diode bridge formed by diodes D1, D2, D3, and D4 rectifies the AC voltage produced at the secondary winding 126 to produce a DC output voltage, $V_{out}$.

In the present invention, transistors 115 and 120 must be responsive to a constant duty cycle control circuit rather than a pulse-width modulator. Thus, the prior art switching power supply 100 must be modified to become the DC/AC switching power converter 140 of FIG. 3b. In FIG. 3b, a control circuit 32 controls the switching of transistors 115 and 120 such that when transistor 115 is ON, transistor 120 is OFF. Similarly, when transistor 115 is OFF, transistor 120 is ON. The switches are switched at a fixed rate. In this fashion, an alternating current having a constant duty cycle is generated through the primary winding 125. In a preferred embodiment, control circuit 32 switches transistors 120 and 115 such that the ON and OFF times of each transistor are equal, thereby producing an alternating current through the primary winding 125 having a 50% duty cycle. In embodiments having a boost power converter to generate the internal voltage output, the switching power supply 140 no longer needs the inductor L1 illustrated in FIG. 3a.

Figure 4:
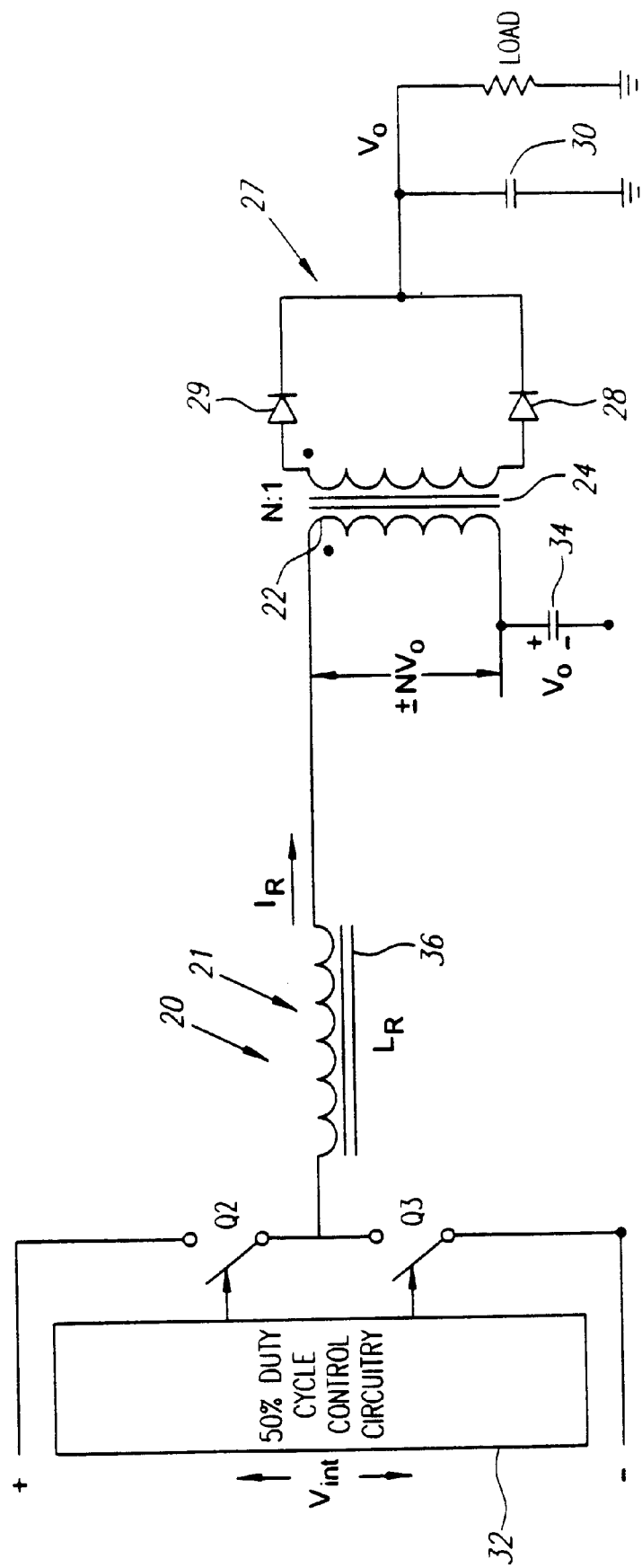
FIG. 4 is illustrates an alternating current tank in a series resonant tank configuration according to one embodiment of the invention.

In contrast to conventional switching power converters such as illustrated in FIG. 3b, a full-wave resonant transition converter, referred to herein as an alternating current tank, possesses desirable low noise and loss properties for use as the DC/AC switching power converter 20. Referring now to FIG. 4, an alternating current tank 21 couples to $V_{int}$ to generate an output voltage that is isolated from $V_{in}$. The alternating current tank 20 includes a storage capacitor 34 that is either in series or in parallel with the primary winding 22 of a transformer 24. A first and a second switch (illustrated here as switches Q2 and Q3, respectively) couple to the primary winding 22 and storage capacitor 34. As explained herein, the alternating current tank 20 generates an alternating current through the primary winding 22 by switching switches Q2 and Q3 ON and OFF at a constant duty cycle. The preferred constant duty cycle is a 50% duty cycle and this will be the duty cycle used in the remaining discussion. That is not to imply, however, that a different constant duty cycle would be unsuitable. The alternating current (AC) thus induced through the secondary winding 26 may be rectified or used as AC. In the embodiment of the alternating current tank illustrated in FIG. 4, a rectifier 27 on the secondary side of the transformer rectifies the current through the load. The rectifier 27 may be either a full-wave or half-wave rectifier as is known in the art. In one embodiment, the rectifier 27 comprises a center tapped secondary winding 26 coupled to diodes 29 and 28 and output capacitor 30 to form a full wave rectifier such that current is unidirectional through the load.

As described herein, the alternating current tank 21 may be in either a series resonant tank or a parallel resonant tank configuration. Such configurations have the storage capacitor 34 and the primary winding 22 in series or parallel, respectively, as described above. However, in such configurations, the value of a capacitance of the storage capacitor 34, a leakage inductance 36 of the primary winding 22, and the period of the 50% duty cycle used to operate switches Q2 and Q3 are such that resonant waveforms are generated. Because these configurations permit zero-transition switching of switches Q2 and Q3, which reduces stress and loss, they will be described with respect to the series and parallel embodiments of the alternating current tanks described herein. That is not to imply, however, that a non-resonant DC/AC switching power converter 20 such as illustrated in FIG. 3b is not included within the scope of the invention.

The operation of the alternating current tank 20 of FIG. 4 in a series resonant tank configuration occurs as follows. Control circuit 32 drives a first resonant switch Q2 and a second resonant switch Q3 such that when Q2 is ON, Q3 is OFF. Conversely, control circuit 32 drives Q2 OFF when Q3 is ON. When Q2 is on, the internal output voltage is coupled to the series-connected storage capacitor 34 and primary winding 22, thereby charging the storage capacitor 34 and inducing a half-wave quasi-sinusoidal current in a first direction through the primary winding 22 and the resonant tank circuit formed by the storage capacitor 34 and the leakage inductance 36 of the primary winding (represented separately from the primary winding for illustration purposes). Conversely, when Q3 is on, series-connected storage capacitor 34 and the primary winding 22 are uncoupled from the internal voltage output such that the charged storage capacitor 34 discharges and a half-wave quasi-sinusoidal current is induced in a second direction, opposite to that of the first direction, through the primary winding 22 and the resonant tank circuit formed by the storage capacitor 34 and the linkage inductance 36.

Figure 5:
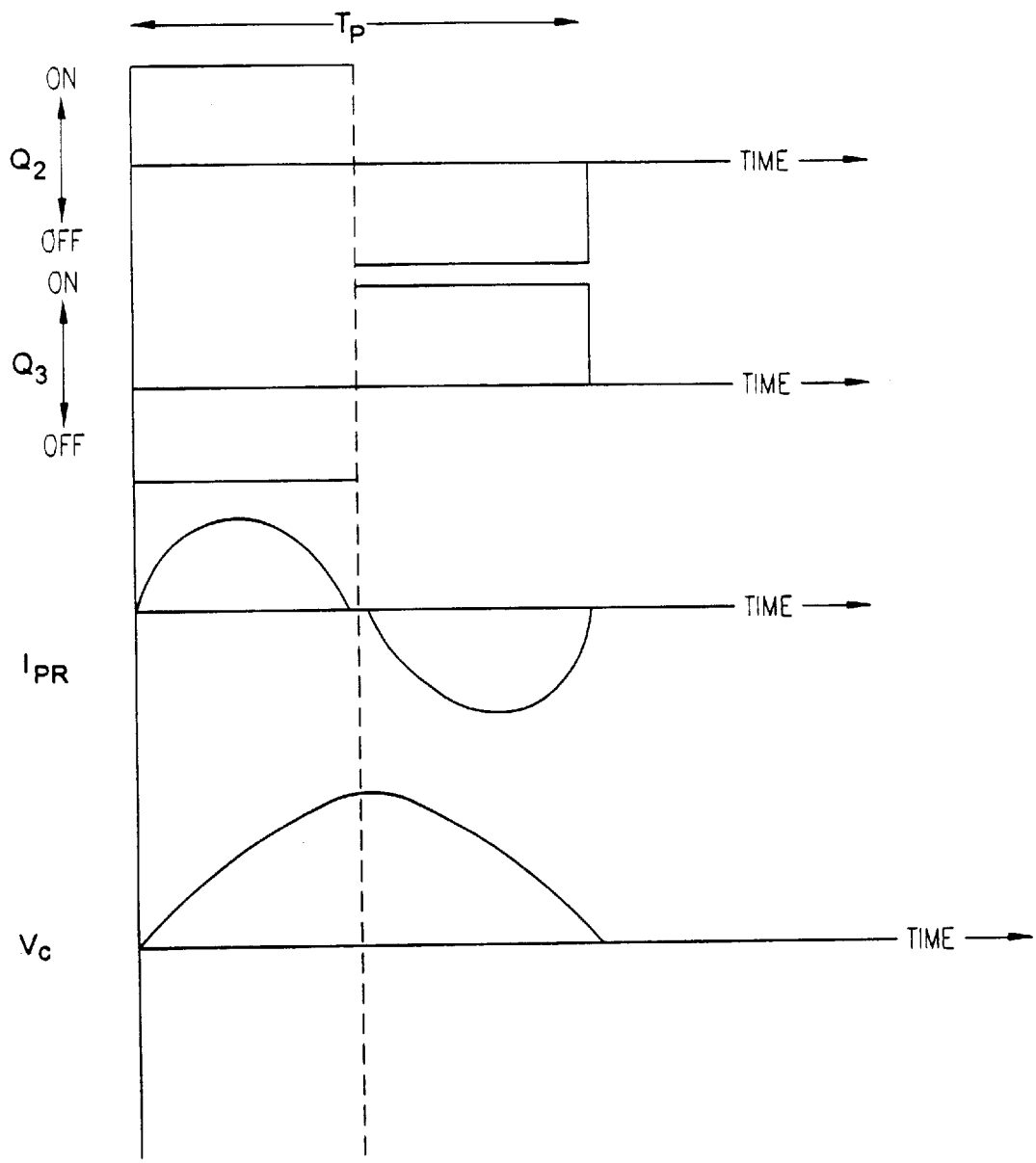
FIG. 5 is a graphical representation of the switch signals and the quasi-sinusoidal resonant currents in the circuit of FIG. 4.

The control circuit 32 operates the resonant switches Q2 and Q3 at substantially a 50% duty cycle such that the ON time equals the OFF time of each resonant switch. Referring now to FIG. 5, the relationship between the ON and OFF times of Q2 and Q3, the full-wave quasi-sinusoidal current induced in the primary winding 22, $I_{PR}$, and the voltage, Vc, across the storage capacitor 34 is illustrated. As can be seen from inspection of FIG. 5, the resonant switches Q2 and Q3 are turned ON and OFF when the current $I_{PR}$ is zero, hence the denotation of a "zero-current" resonant converter. In this fashion, switching losses are minimized. Moreover, because the ON and OFF times of each resonant switch are equal, the primary winding 22 is effectively excited by a full-wave sinusoidal current. During the time Q2 is ON, the voltage, Vc, across the storage capacitor charges to a maximum value. During the time Q3 is ON, the voltage $V_c$ discharges to zero. Note that there will be ordinarily some dead time (not illustrated) wherein Q2 has turned OFF but Q3 has not yet turned ON. In addition, the resonant frequency of the series resonant tank formed by the storage capacitor and the leakage inductance of the primary winding must be chosen such that the half-wave sinusoidal current waveform can be completed during the time when the resonant switches are ON. Thus, the current $I_{PR}$ is not a true full-wave sinusoid but rather a full-wave quasi-sinusoid. Nevertheless, the departure of $I_{PR}$ from a true sinusoidal wave may be minimal.

The period $T_p$ of the 50% duty cycle for each of the switches Q2 and Q3 is controlled by the control circuit 32. In one embodiment, control circuit 32 may comprise a high voltage half bridge driver with oscillator, model L6571A or L6571B from SGS-Thomson Microelectronics. The period $T_p$ determined by the control circuit must be related to the period of the quasi-sinusoidal resonant current. As can be seen from inspection of FIG. 5, $T_p$ must be greater than the period of the quasi-sinusoidal resonant current ($I_{PR}$) of the series resonant tank circuit formed by the linkage inductance 36 and the storage capacitor 34 so that each half cycle of the resonant current may finish during the ON time of its corresponding switch Q2 or Q3. For example, during the time Q2 is ON, $I_{PR}$ must cycle from zero, through a maximum, and back to zero again. If the resonant frequency $f_r$ of the tank circuit was too slow, the quasi-sinusoidal resonant current $I_{PR}$ would not be able to finish a half cycle during this time.

Consider the following example. If $T_p$ is set at 20 μs, then each half period (i.e., the time Q2 or Q3 is ON) is 10 μs. Thus, to assure completion of a half wave of the resonant current $I_{PR}$, the resonant half period should be less than this time, for example 8 μs. Such a half period gives a resonant frequency $f_r$ of 55.6 KHZ. For a series (and also a parallel) resonant tank circuit, the resonant frequency (in Hz) is given by $$f_r = 1/(2\pi * \text{sqrt}(L_R C_R))$$

where $L_R$ is the value of the leakage inductance and $C_R$ is the value of the resonant capacitance. Inspection of this equation indicates that to increase the resonant frequency $f_r$, the value of the (in this case, resonant) storage capacitor $C_R$ should be minimized. This leads to a design choice, because the output power of the primary winding 22 may be approximated as $$P_{primary} = (C_R * V^2 * f_r)/2$$

where V is the voltage across the primary winding 22 and $P_{primary}$ is the output power of the primary winding 22. Note that the contribution to $P_{primary}$ from the leakage inductance may be neglected due because the leakage inductance is typically quite small compared to the mutual inductance of the primary winding. Thus, if the mutual inductance is a few milliH, the leakage inductance will be a few $\mu$H.

Inspection of the equation for $P_{primary}$ reveals that the output power is increased if the value of the resonant storage capacitor $C_R$ is increased. However, if the value of $C_R$ is increased too much, then $f_r$ will be too slow to allow the resonant current to complete a half cycle during the times when either Q2 or Q3 is ON. Thus, tradeoffs should be made between the switching period $T_p$, the resonant (storage) capacitance and the desired output power.

Figure 6A:
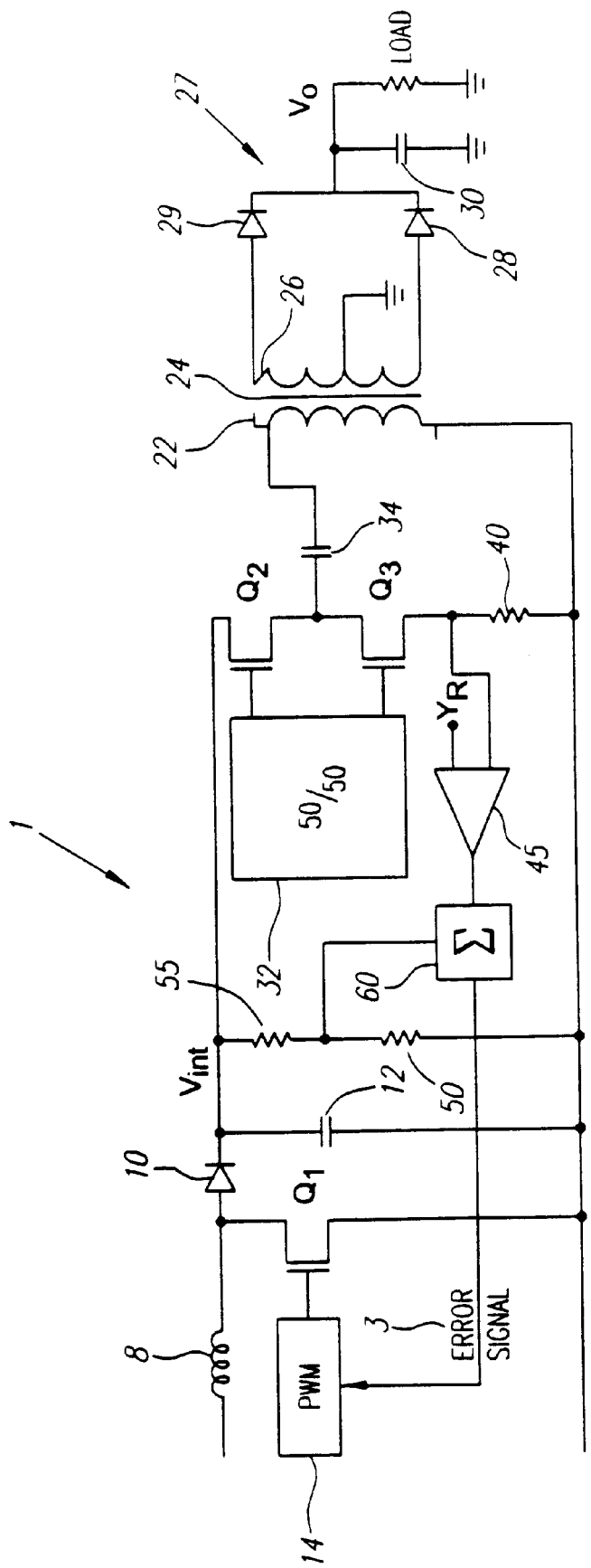
FIG. 6a is a schematic diagram of a power supply comprising a boost power converter coupled to an alternating current tank in a series resonant configuration according to one embodiment of the invention.

An embodiment of the power supply 1 of the present invention wherein the DC/DC converter is a boost power converter and the DC/AC switching power converter is in a series resonant tank configuration may be implemented as shown in FIG. 6a. The internal voltage output, $V_{int}$, is regulated according to the error signal derived by the present invention. This error signal is derived in such a way as to provide load compensation. Load compensation accounts for the voltage losses at the load. To provide load compensation, the present invention uses a feedback signal proportional to the voltage losses at the load, denoted as I^2 feedback 11 in FIG. 1b. The generation of this feedback signal (shown symbolically in estimator 13 in FIG. 1b) will now be discussed. Note that, a priori, a user of the power supply 1 can estimate what the maximum current ($I_{MAX}$) through the load will be as well as the equivalent series resistance (ESR) as "seen" by the primary winding 22. Thus, by Ohm's law, the maximum voltage drop across this equivalent series resistance will be $I_{MAX}$ *ESR. The present invention uses this maximum voltage drop in a novel load compensation technique. This load compensation technique exploits the linearity of the transformer maintained by the constant duty cycle alternating current through the primary winding. Because of this linearity, the output voltage across the load is proportional to the current through the primary winding, $I_{PR}$. Thus, to provide load compensation, the present invention compares the output voltage, $V_o$, which is reflected in the primary current, $I_{PR}$, to the maximum voltage losses expected, which is equal to $I_{MAX}$ *ESR.

This comparison may be done in the following fashion. The current through the primary winding, $I_{PR}$, is sensed through a sense resistor 40 and the resulting voltage input to a differential amplifier 45. The differential amplifier 45 outputs a difference signal proportional to the difference between the voltage on the sense resistor and a reference voltage, $V_R$, proportional to the maximum expected voltage loss at the load. The value of the sense resistor and the proportionality are chosen such that the voltage across the sense resistor 40 and $V_R$ are equal when the current through the load is a maximum (when maximum voltage losses $I_{MAX}$ *ESR are occurring). At such a point the difference signal from the differential amplifier is at a minimum. This minimum signal is reflected in the error signal input to the pulse-width modulator 14 of the boost converter. To account for input line voltage fluctuations affecting the "preregulated" voltage, $V_{int}$, the difference signal from the differential amplifier is summed in a summer 60 with a voltage signal derived from the "preregulated" voltage, $V_{int}$, to produce the error signal 3. Note that this voltage signal could also have a separate path to the pulse width modulator 14. What is important is that the pulse width modulator 14 is responsive to changes in both the preregulated voltage, $V_{int}$, and the difference signal. As illustrated in FIG. 6a, the changes in the preregulated voltage, $V_{int}$, are sensed through a voltage divider formed by resistors 50 and 55.

The load compensation provided by the present invention is further illustrated by the following discussion. It may be shown that the voltage output of the full wave rectifier 27 of FIG. 6a, $V_o$, which is the output voltage across the load, is approximated by $$V_o = V_{int}/2N$$

where N is the turn ratio between the primary winding 22 and the secondary winding 26. It follows from the load compensation described herein that the resonant current through the primary, $I_{PR}$, may be approximated by $$I_{PR} = (V - N\ V_o - (I_o * ESR/N))/Z_o;\ Z_o = sqrt(L_R/C_R)$$

where V is the voltage impressed across the series-connected resonant tank circuit formed by the storage capacitor 34 ($C_R$) and leakage inductance 36 ($L_R$) of the primary winding 22, $I_o$ is the current through the load, ESR is the equivalent series resistance seen by the secondary winding 26, and $Z_o$ is the impedance of the resonant tank circuit formed by the leakage impedance 36 ($L_R$) and the storage capacitor 34 ($C_R$). Thus, $I_{PR}$ will have a value that is also linearly related to $V_{int}$. This demonstrates one of the advantages of the present invention—i.e., no external feedback is necessary from the secondary side 26 of the transformer 24. Instead, a single internal (primary side) feedback loop may be utilized because the peak values of $I_{PR}$ are linearly related to the output voltage. Thus, the often-onerous task of compensating feedback from the secondary side of the transformer may be eliminated.

In the embodiment of the invention illustrated in FIG. 6a, the current through the primary winding, $I_{PR}$, is sensed by coupling the voltage across the sense resistor 40 to an error amplifier 45. The switches Q1, Q2, and Q3 are implemented through semiconductor FET transistors. Note that in an alternate embodiment, the sense resistor 40 could have been placed in series with the primary winding 22, such that $I_{PR}$ could be sensed in each half cycle of the quasi-sinusoidal current flowing through the primary winding 22. In such an embodiment, however, the sensed voltage would be bipolar, alternating in polarity with each half cycle. To use a conventional differential amplifier 45 with this bipolar signal would require rectification. Thus, it is preferred to sense $I_{PR}$ only in the half cycle when switch Q3 is ON by placing the sense resistor in series with switch Q3.

Notably, both voltage and current feedback are used in the internal feedback loop of FIG. 6a: current feedback provided by sensing $I_{PR}$, and voltage feedback provided by sensing $V_{int}$. Such an arrangement provides an advantageous degree of control over the output voltage $V_o$.

As can be seen from the equation for the primary current, $I_{PR}$, given herein, the effects of load losses are reflected in the value of $I_{PR}$ through the ($I_o$*ESR/N) term. Thus, sensing the primary current and adjusting the PWM accordingly does provide load compensation. In the circuit of FIG. 6a, load compensation will not substantially dominate the error signal unless the voltage across the sense resistor 40 rises to a level relatively close to $V_R$. Prior to this point, the internal voltage output, $V_{int}$, is largely controlled by the error signal provided through the voltage divider formed by resistors 55 and 50. When $I_{PR}$ rises such that $V_R$ is approached across the sensing resistor 40, the differential amplifier 45 will produce a minimum signal. This minimum signal will dominate over that produced by the voltage divider such that the PWM modulator 14 is adjusted largely by just the current feedback.

Moreover, the present invention does not exclude the use of an external feedback loop coupled through the use of optoisolators, or other isolation means, as implemented in conventional flyback converters and the like. Indeed, an embodiment of the present invention may have solely an external feedback loop as is known in the art and still possess advantageous properties because of the efficiencies inherent when an alternating current tank couples to a PWM switched converter. Regardless of the type of feedback, the characteristics of the resonant tank circuit within the alternating current tank 20 remains constant: no adjustment in the switching speed of Q2 and Q3 need be made. Thus, unlike prior art resonant converters, power factor correction and regulation of the alternating current tank 20 is controlled through adjusting the PWM of the power converter 5, not by internal adjustments of the resonant tank.

Figure 6B:
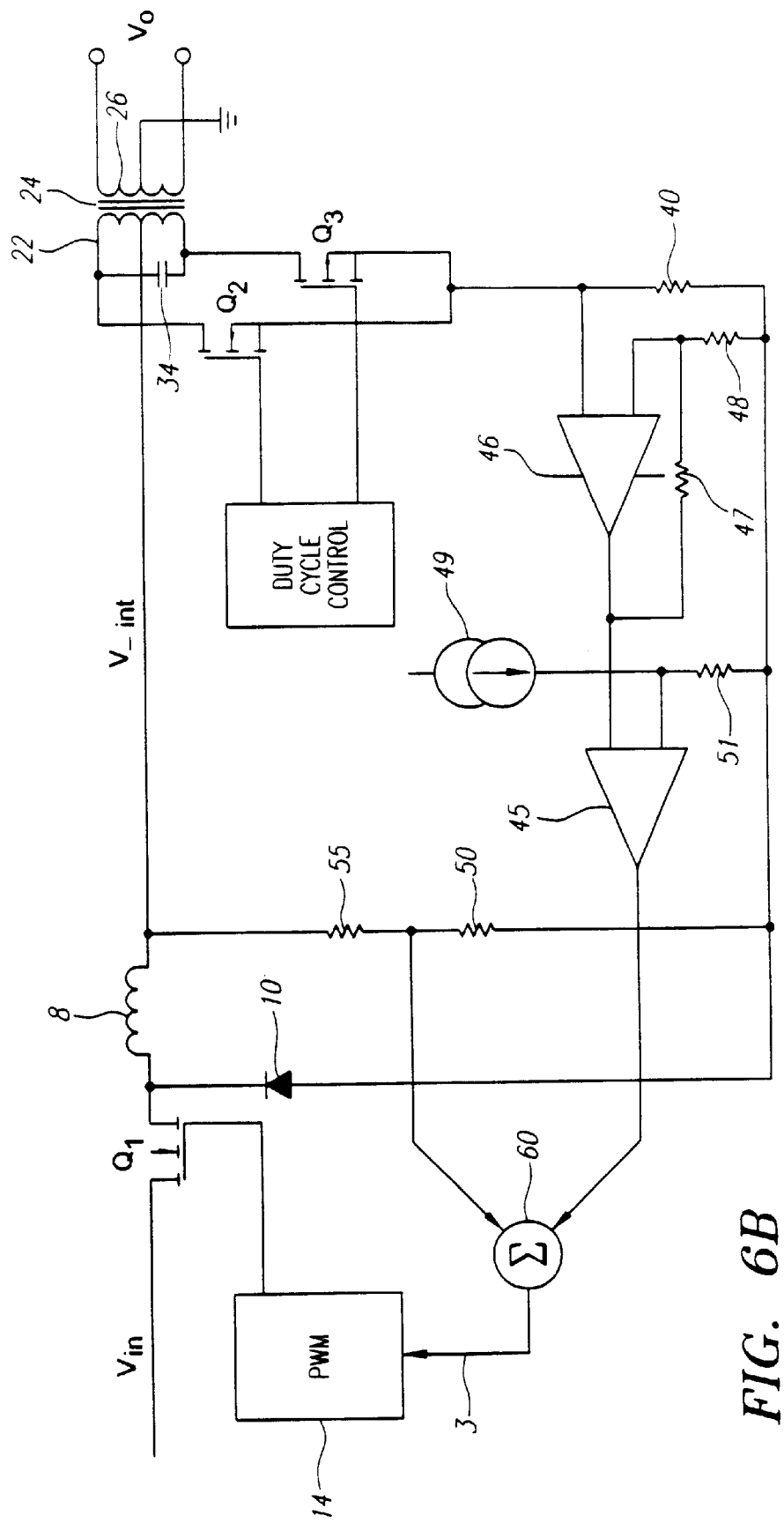

The load compensation feedback provided by the differential amplifier 45 may be further implemented as illustrated in FIG. 6b. Rather than just couple an input of the differential amplifier 45 to the voltage across the sense resistor 40, this voltage may first be amplified by amplifier 46. As illustrated, amplifier 46 is in the non-inverting configuration whose gain is determined by resistors 47 and 48. Those of ordinary skill will appreciate that other amplifier configurations may be used. The resulting amplified voltage is coupled as an input to the differential amplifier 45. A constant current source 49 coupled to a resistor 51 provides the reference voltage $V_R$.

Figure 7:
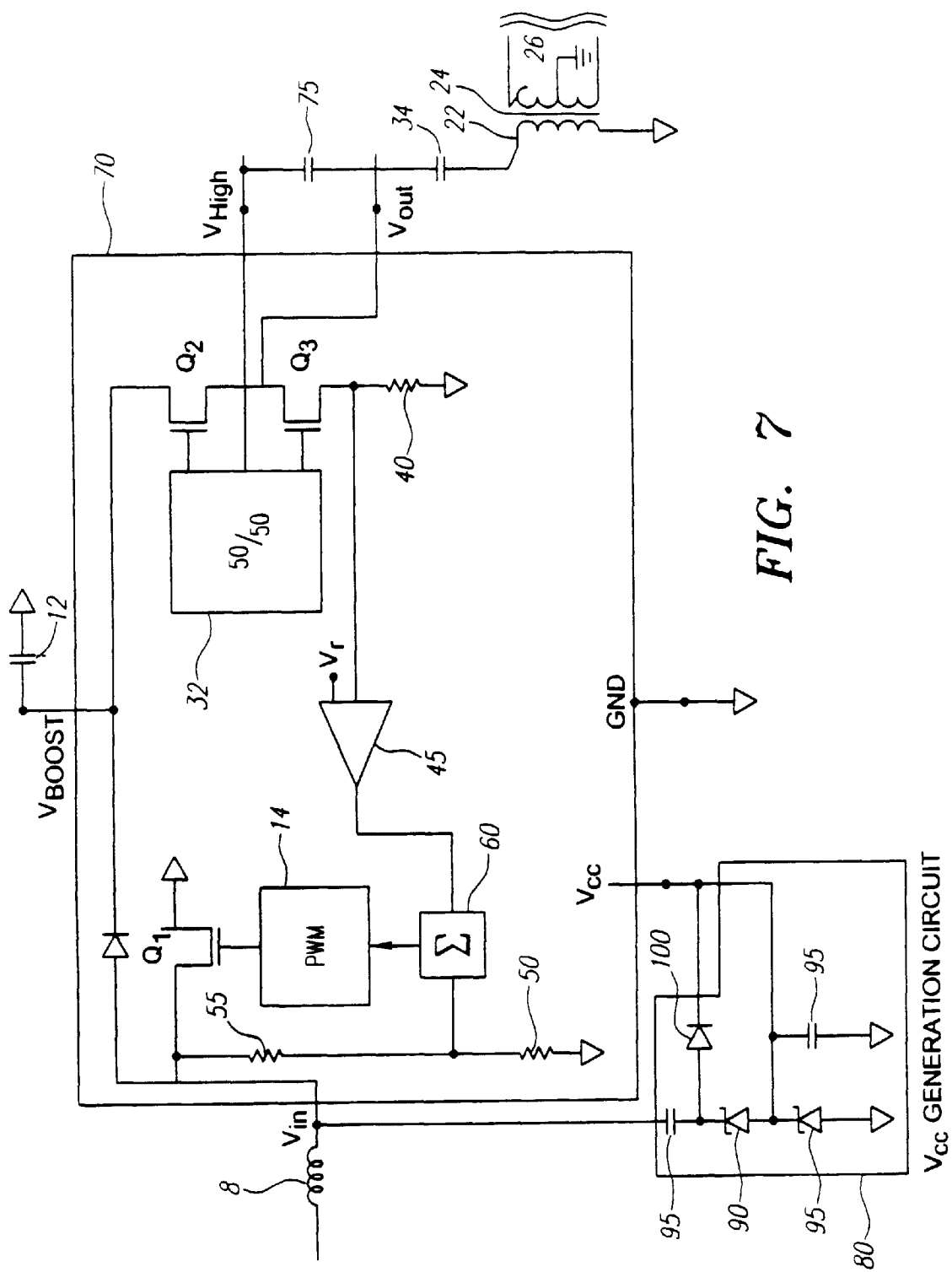
FIG. 7 is a schematic diagram of the power supply of FIG. 6a, wherein portions of the power supply are incorporated into an integrated circuit.

Portions of the circuit of 6a may be packaged into a single integrated circuit. Turning now to FIG. 7, in one embodiment of the invention, an integrated circuit 70 having six leads is illustrated. Contained within integrated circuit 70 are the steering diode 10, the three switching transistors Q1, Q2, and Q3, the pulse width modulator 14, the 50% duty cycle control circuit 32, the differential amplifier 45, the summer 60, the sensing resistor 40, and the voltage divider formed by resistors 55 and 50 all coupled as described with respect to FIG. 6a. Components that are difficult to construct on a semiconductor substrate may be located externally to the integrated circuit 70.

Thus, the boost inductor 8 is external to the circuit 70 and couples to a Vin lead. The steering diode 10 couples to the external boost capacitor 12 through a Vboost lead. A Vout lead allows the resonant switches Q2 and Q3 to couple the resonant current $I_{PR}$ to the externally located storage capacitor 34 and transformer 24. The transformer 24 has a primary winding 22 and secondary winding 24, as discussed with respect to FIG. 6a. It is to be noted that resonant switch Q2 couples to the high internal voltage within the integrated circuit 70. Thus, a high voltage capacitor 75 coupled to $V_{out}$ and to the control circuit 32 through a lead, Vhigh, allows the control circuit to efficiently switch on the resonant switch Q2. A $V_{cc}$ lead and a ground lead (Gnd) complete the integrated circuit 70.

As shown in FIG. 7, a conventional $V_{cc}$ generation circuit 80 couples to the $V_{in}$ lead. Although those of ordinary skill in the art will appreciate that many configurations could be used for this circuit, $V_{cc}$ generation circuit 80 is shown comprising the zener diodes 90, the capacitors 95 and 96 and diode 100. Such a circuit provides a dependable voltage $V_{cc}$ for use in powering the components of the integrated circuit 70. Moreover, Vcc generation circuit 80 provides a convenient means to control $V_R$. It can be shown that the amount of current drawn into the $V_{cc}$ input pin will depend upon the value of the capacitor 95. The higher the value of capacitor 95, the greater the amount of current flowing in the $V_{cc}$ input pin. Sensing circuitry (not illustrated) within the integrated circuit 70 senses a voltage produced by the current through the $V_{cc}$ input pin. A voltage inverter (not illustrated) within the integrated circuit 70 inverts the sensed voltage to produce $V_R$. Thus, the value of is $V_R$ is inversely proportional to the value of capacitor 95.

$V_{cc}$ is distributed to the components needing power in the integrated circuit 70 using a conventional network (not illustrated). Note that the integrated circuit 70 includes both types of feedback inputs discussed previously, i.e., the resonant current $I_{peak}$ through sensing resistor 40, and the internal voltage output $V_{int}$ through the voltage divider formed by resistors 50 and 55. In alternate embodiments of the integrated circuit 70, only one of these feedback inputs could be utilized to affect the pulse width modulator 14. In addition, integrated circuit 70 could be modified to accept feedback from the external side of the transformer 24, as discussed with respect to conventional flyback power converters.

Figure 8:
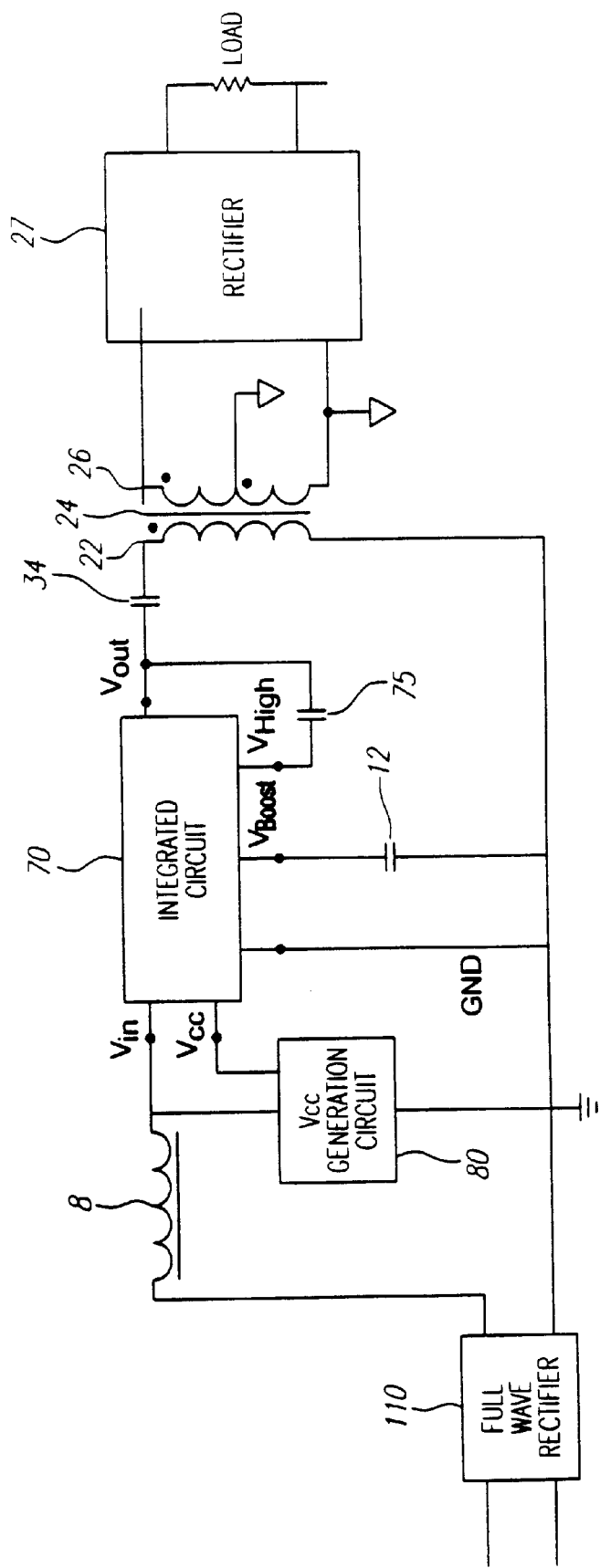
FIG. 8 is a schematic diagram illustrating the integrated circuit of FIG. 7, incorporated into an AC input power supply.

Referring now to FIG. 8, the integrated circuit 70 of FIG. 6a may be implemented to form an AC input power supply. An AC power source is coupled to a conventional full wave rectifier 110 to produce a rectified input for coupling to the boost inductor 8, which in turn couples to the Vin lead of the integrated circuit 70. The remaining leads are coupled as described with respect to FIG. 6a. In addition, the rectifier 27 on the secondary side of the transformer 24 and the load are illustrated. It is to be noted that the AC input power supply of FIG. 8 may be modified to include feedback from the secondary side of the transformer 24 through the use of optoisolators or the like.

Figure 9A:
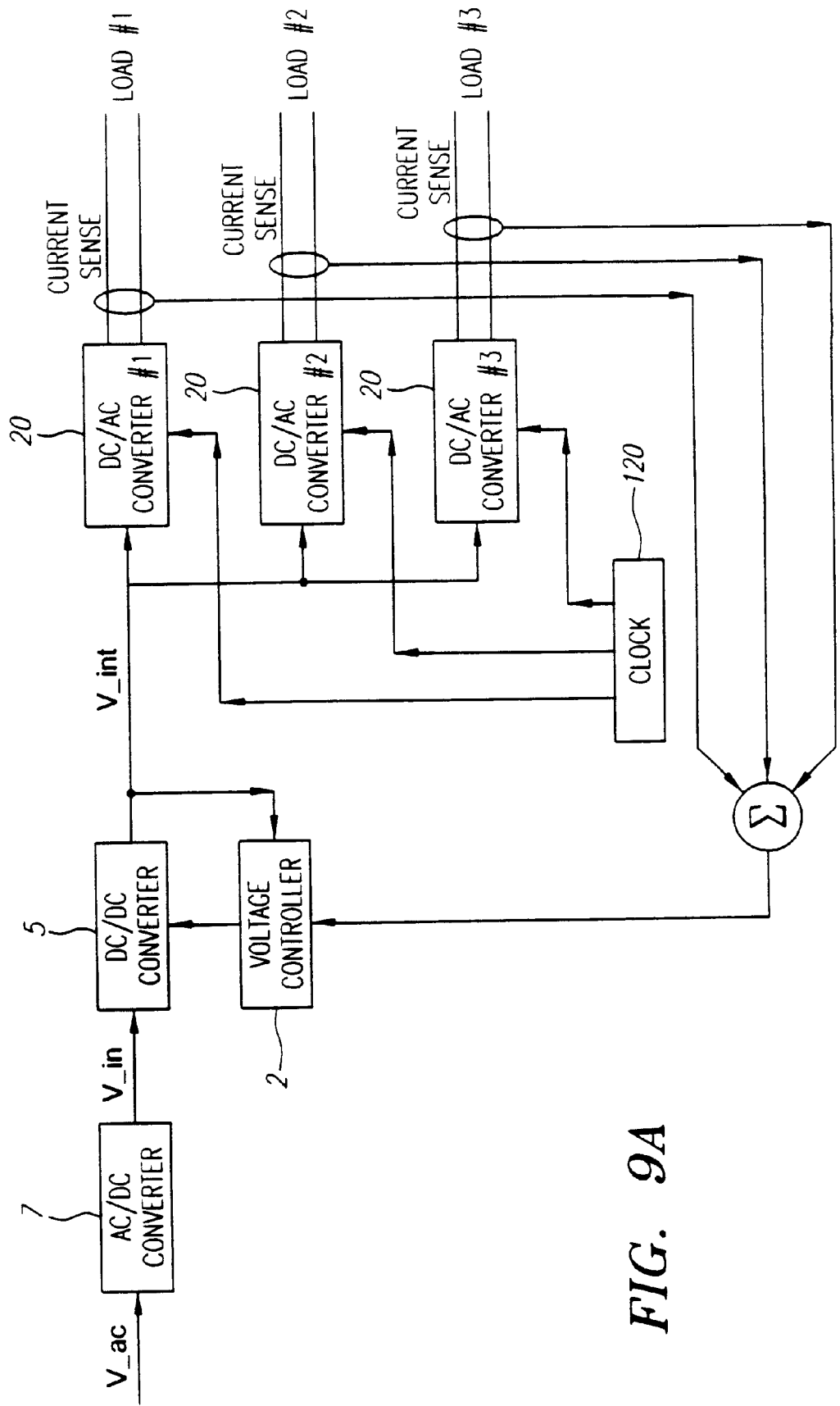
FIG. 9a is a block diagram illustrating a DC/DC power converter coupled to a plurality of DC/AC alternating current tanks according to one embodiment of the invention.

The embodiments of the invention described to this point have comprised a single "front end" (the modulated switching power converter) coupled to a single "back end" (the alternating current tank). The inventor has discovered that additional power and linearity may be provided by coupling a modulated switching power converter to a plurality of switching power converters as illustrated in FIG. 9a. In this embodiment, the DC/DC power converter 5 is responsive to an error signal for regulating an internal regulated voltage output as in the previously described embodiments. A plurality of DC/AC switching power converters 20 are coupled in parallel to the internal regulated voltage output. This plurality of DC/AC switching power current tanks 20 may be "hardwired" to the internal regulated voltage output such that each alternating current tank 20 within the plurality is always connected to the internal voltage output and constantly operating. Alternatively, an optional regulating switch (not illustrated) may couple between the plurality of DC/AC switching power converters 20 and the power converter 5. The regulating switch couples a given DC/AC switching power converter 20 to the internal voltage output on an as-required basis. Regulating switch thus includes logic coupled to a feedback loop. The logic controls active switches, such as FETs, within the regulating switch that couple a given switching power converter to the internal voltage output. The voltage output from each of the switching power converters 20 within the plurality may be rectified or used as an AC output before being coupled in parallel to the load. A clock 120 may couple to each of the switching power converters 20 to permit the switches within the alternating current tank to operate synchronously with each other. The clock 120 would thus, in one embodiment, provide a pulse to trigger the control circuit within each DC/AC switching power converter to start a switching cycle. As discussed herein, the DC/DC power converter 5 may be of any type known in the art, for example, a boost or a buck converter. Each DC/AC switching power converter within the plurality of DC/AC switching power converters may be a half-bridge, full-bridge, flyback, push-pull, or a fall-wave resonant transition converter wherein an error amplifier in each converter generates the control signal as described previously. Similarly, the control signals and a signal proportional to the internal voltage derived from a voltage divider coupled to the internal voltage output are all combined to form the error signal.

Figure 9B:
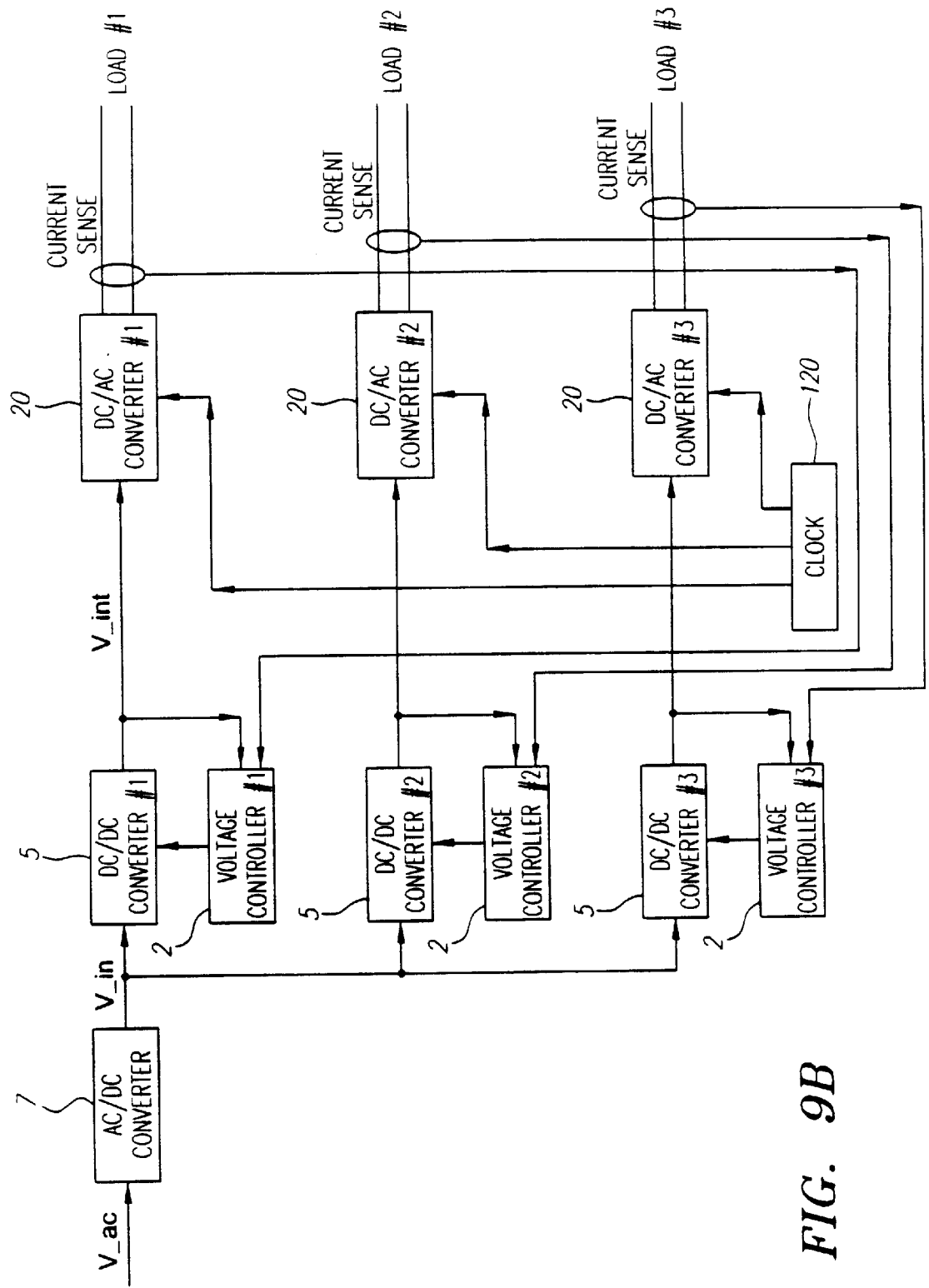
FIG. 9b is a block diagram illustrating a plurality of the power supplies of FIG. 1a wherein each power supply is coupled to the same unregulated input voltage.

An alternate embodiment having a plurality of DC/AC switching power converters 20 is shown in FIG. 9b. In this embodiment, each DC/AC switching power converter 20 is coupled to a separate regulated internal voltage output, $V_{int}$, produced by its respective DC/DC power converter 5. Each coupled DC/DC converter 5 and DC/AC switching power converter 20 forms a separate power supply 1 as described with respect to FIG. 1a. Thus, the voltage controller 2 for each DC/DC converter 5 is responsive to a signal proportional to its respective $V_{int}$ and to its respective control signal proportional to the voltage losses at its load. A clock 120 may provide a pulse the control circuit in each DC/AC converter 20 to ensure that the switches are switched synchronously as described with respect to FIG. 9a.

Figure 10A:
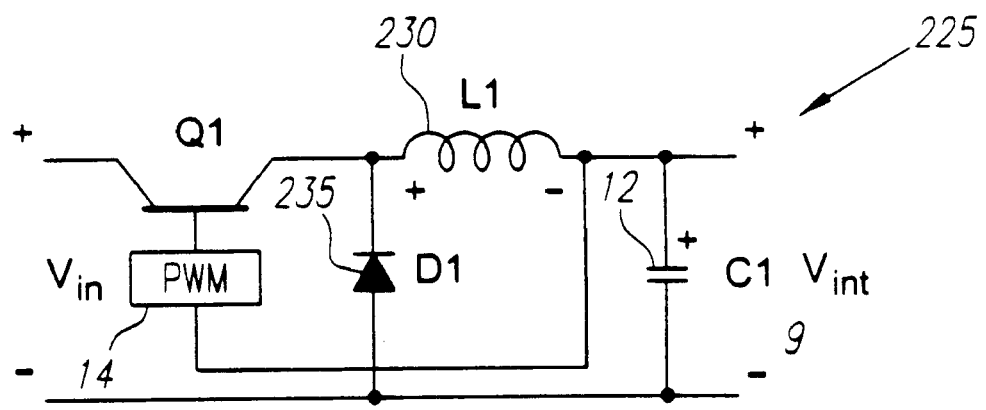
FIG. 10a illustrates a prior art PWM buck power converter.
Figure 10B:
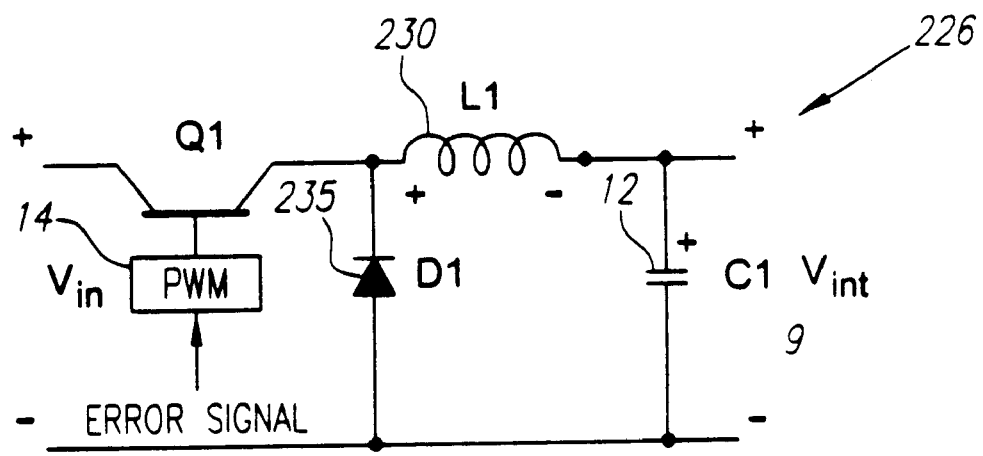
FIG. 10b illustrates a PWM buck power converter according to one embodiment of the invention.

Regardless of whether a single DC/AC switching power converter or a plurality of DC/AC switching power converters are used, the "front end" of the power supply may be a buck power supply. As discussed with respect to the boost power supply of FIG. 2a, a minor modification of prior art buck power supply designs is necessary. This modification is illustrated in FIGS. 10a and 10b. Turning now to FIG. 10a, a prior art buck power converter 225 is illustrated. The buck converter 225 comprises a power switch Q1 (typically a field effect transistor (FET)) coupled to a buck inductor 230, a steering diode 235, and a storage capacitor 12. A pulse width modulator 14 adjusts a duty cycle of the power switch Q1 in response to sensing an output voltage, $V_{out}$. The relationship between the input voltage, $V_{in}$, and $V_{out}$ may be approximated as $$V_{out}=V_{in}*(t_{on}/T)$$

where T is the switching period and $t_{on}$ is the ON time of the power switch Q1. Inspection of FIG. 10a reveals that, just as with the boost power converter of FIG. 2, the ground of $V_{out}$ is not isolated from that of $V_{in}$. FIG. 10b illustrates a buck power supply 226 for the present invention. Unlike the prior art buck power supply 225, the pulse width modulator 14 is responsive to the uniquely derived error signal of the present invention to regulate $V_{out}$. Because the output voltage will be coupled to a switching power converter, it is now denoted as an internal voltage output, $V_{int}$.

Figure 11:
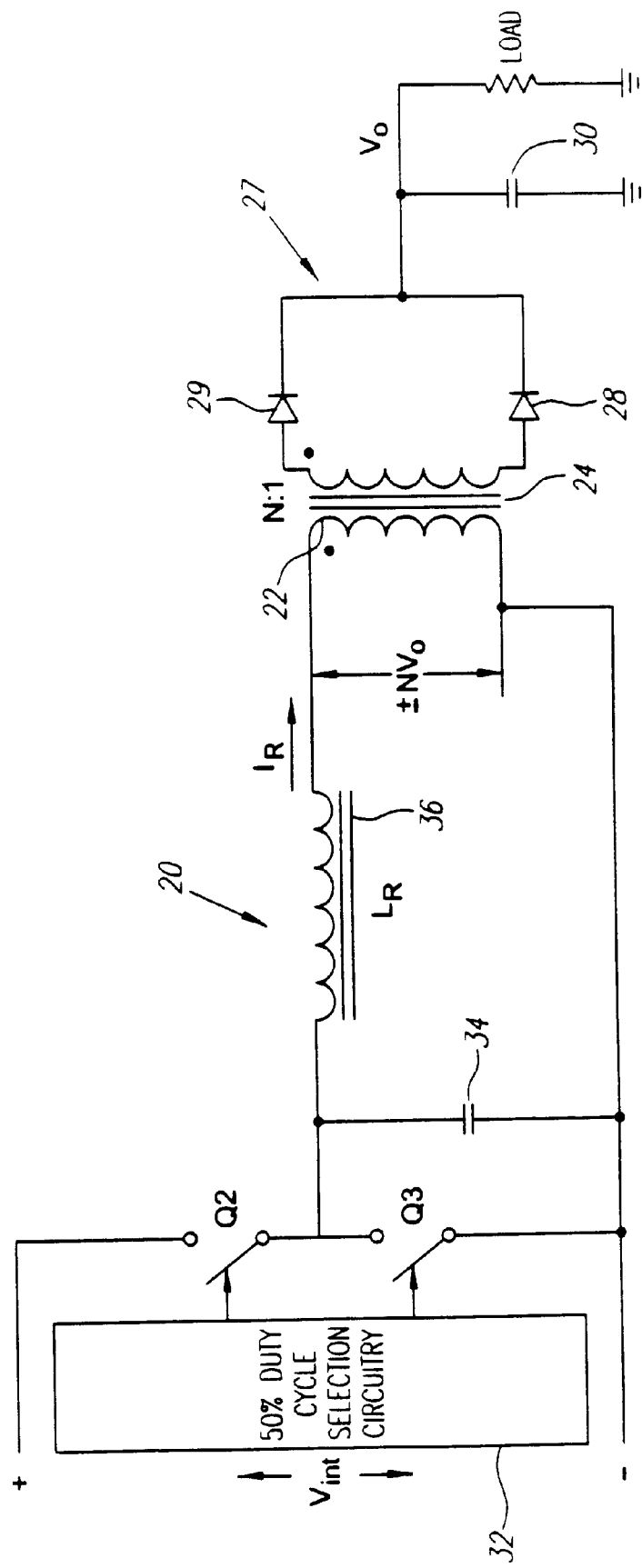
FIG. 11 is a schematic diagram of an alternating current tank in a parallel resonant tank configuration according to one embodiment of the invention.

Just as the "front end" may be either a boost or a buck converter, the "back end" alternating current tank may have its storage capacitor either in series or in parallel with the primary winding of its transformer. Turning now to FIG. 11, an alternating current tank 20 is illustrated in which storage capacitor 34 is in parallel with the primary winding 22. The remainder of the alternating current tank 20 is as described with respect to FIG. 4. The inventor has discovered that in such a configuration, it is preferable that a parallel resonant tank circuit be formed between the storage capacitor 34 and the leakage inductance 36 of the primary winding 22. As is known from the duality of parallel vs. series resonant tanks, rather than exciting a quasi-sinusoidal current through the primary winding as discussed with respect to FIG. 5, the alternating current tank of FIG. 11 has a quasi-sinusoidal voltage excited through the primary. An alternating current, is, of course, still present in the primary winding 22. However, the alternating current has a square waveform instead of a quasi-sinusoidal waveform. As illustrated, a rectifier 27 coupled to the secondary winding 26 is used to rectify the current through the load. If desired, however, the rectifier could be omitted, resulting in an alternating current flowing through the load. It is to be noted that, in certain high power applications, the leakage inductance of the transformer may be too small for efficient resonant performance. In such circumstances, an additional inductor (not illustrated) arranged in parallel with the storage capacitor 34 might be required for efficient resonant performance.

Specific examples of the present invention have been shown by way of example in the drawings and are herein described in detail. It is to be understood, however, that the invention is not to be limited to the particular forms or methods disclosed, but to the contrary, the invention is to broadly cover all modifications, equivalents, and alternatives encompassed by the scope of the appended claims.

I claim:

1. A power supply, comprising;

a voltage regulator responsive to an error signal for regulating a DC internal voltage output; and a DC/AC switching power converter including a transformer having a primary winding coupled to the DC internal voltage output and one or more power switches;

a control circuit driving the one or more power switches at a constant duty cycle such that an alternating current having a constant duty cycle flows through the primary winding; and an error amplifier having an input coupled to a current sensor, the current sensor sensing a voltage proportional to the current through the primary winding, the error amplifier having another input coupled to a reference voltage proportional to a maximum expected voltage loss on a load coupled to a secondary winding of the transformer, the error amplifier outputting a control signal proportional to the difference between the reference voltage and the voltage sensed by the current sensor;

wherein the error signal is based upon the control signal and a signal proportional to the internal voltage output.

2. The power supply of claim 1, wherein the voltage regulator is a pulse-width-modulated switching power converter, the pulse width modulation responsive to the error signal to thereby modulate the DC internal voltage output.

3. The power supply of claim 2, wherein the pulse-width-modulated switching power converter is a boost converter.

4. The power supply of claim 2, wherein the pulse-width-modulated switching power converter is a buck converter.

5. The power supply of claim 3, wherein the one or more power switches comprise a first power switch and a second power switch, the control circuit configured for alternately switching ON and OFF the first and second power switches, the first power switch being ON when the second power switch is OFF and the second power switch being ON when the first power switch is OFF, the control circuit alternately switching the first and second power switches such that the ON and OFF times of each power switch are substantially equal, wherein a first half cycle of the alternating current flows through the primary winding when the first power switch is ON, and a second half cycle of the alternating current flows through the primary winding when the second power switch is ON, whereby the constant duty cycle of the alternating current is substantially 50%.

6. The power supply of claim 5, wherein the primary winding is in series with a resonant capacitor, the resonant capacitor and a leakage inductance of the primary winding forming a series resonant tank having a resonant frequency less than or equal to a period of the control circuit, whereby each half cycle of the alternating current is a half-wave quasi-sinusoidal current and the DC/AC switching power converter is a resonant converter.

7. The power supply of claim 5, wherein the primary winding is in parallel with a resonant capacitor, the resonant capacitor and a leakage inductance of the primary winding forming a parallel resonant tank having a resonant frequency less than or equal to a period of the control circuit, whereby when the first power switch is ON, a first half-wave quasi-sinusoidal voltage is impressed across the primary winding, and when the second power switch is ON, a second half-wave quasi-sinusoidal voltage is impressed across the primary winding, the second half-wave quasi-sinusoidal voltage being antipodal to the first half-wave quasi-sinusoidal voltage.

8. The power supply of claim 5, wherein the pulse width modulation is further responsive to sensing the voltage across the secondary winding through an isolator.

9. The power supply of claim 8, wherein the isolator is an optoisolator.

10. The power supply of claim 1, wherein the voltage regulator is a linear regulator and the DC/AC switching power converter is a half-bridge power converter.

11. A power supply, comprising:
a voltage regulator responsive to an error signal for regulating a DC internal voltage output;
a plurality of DC/AC switching power converters, each DC/AC switching power converter including:
a transformer having a primary winding coupled to one or more power switches and the DC internal voltage output;
a control circuit to drive the one or more power switches at a constant duty cycle such that an alternating current having a constant duty cycle flows through the primary winding; and
an error amplifier having an input coupled to a current sensor, the current sensor sensing a voltage proportional to the current through the primary winding, the error amplifier having another input coupled to a reference voltage proportional to the maximum expected voltage loss on a load coupled to a secondary winding of the transformer, the error amplifier outputting a control signal proportional to the difference between the reference voltage and the voltage sensed by the current sensor, wherein the error signal is formed by combining each control signal with a signal proportional to the internal voltage output; and
a clock coupled to the plurality of DC/AC switching power converters, wherein the one or more power switches within a given DC/AC switching power converter from the plurality of DC/AC switching power converters arc switched synchronously with the one or more power switches in each of the DC/AC switching power converters remaining in the plurality of DC/AC switching power converters.

12. The power supply of claim 11, wherein the voltage regulator is a pulse-width-modulated switching power converter, the pulse width modulation being responsive to the error signal to modulate the DC internal voltage output, and wherein within each DC/AC switching power converter the one or more switches comprise a first and a second power switch, the control circuit alternately switching ON and OFF the first and second power switches, the first power switch being ON when the second power switch is OFF and the second power switch being ON when the first power switch is OFF, the control circuit alternately switching the first and second power switches such that the ON and OFF times of each power switch are substantially equal wherein a first half cycle of the alternating current flows through the primary winding when the first power switch is ON and a second half cycle of the alternating current flows through the primary winding when the second power switch is ON, whereby the constant duty cycle of the alternating current is substantially 50%.

13. The power supply of claim 11, wherein the pulse-width-modulated switching power converter is a boost power converter.

14. The power supply of claim 13, wherein, within each DC/AC switching power converter in the plurality of DC/AC switching power converters, the primary winding is in series with a resonant capacitor, the resonant capacitor and a leakage inductance of the primary winding forming a series resonant tank having a resonant frequency less than or equal to a period of the control circuit, whereby each half cycle of the alternating current is a half-wave quasi-sinusoidal current.

15. The power supply of claim 13, wherein, within each DC/AC switching power converter in the plurality of DC/AC switching power converters, the primary winding is in parallel with a resonant capacitor, the resonant capacitor and a leakage inductance of the primary winding forming a parallel resonant tank having a resonant frequency less than or equal to a period of the control circuit, whereby when the first power switch is ON, a first half-wave quasi-sinusoidal voltage is impressed across the primary winding, and when the second power switch is ON, a second half-wave quasi-sinusoidal voltage is impressed across the primary winding, the second half-wave quasi-sinusoidal voltage being antipodal to the first half-wave quasi-sinusoidal voltage.

16. A method of generating power, comprising:
generating an internal regulated voltage output using a voltage regulator wherein the regulation is responsive to an error signal;
coupling the internal regulated voltage output to a primary winding of a transformer by switching one or more power switches of a DC/AC switching power converter during a first period wherein a first half cycle of an alternating current flows through the primary winding;
uncoupling the primary winding from the internal voltage output by switching the one or more power switches during a second period wherein a second half of the alternating current flows through the primary winding, the duty cycle formed by the first and second period being kept constant;
forming the difference between a reference voltage proportional to the maximum expected voltage losses at a load coupled to a secondary winding of the transformer and a voltage proportional to the output voltage to form a control signal; and
combining the control signal with a signal proportional to the internal output voltage to form the error signal.

17. The method of claim 16, wherein the duty cycle is equal to 50%.

* * * * *